US006431447B1

(12) United States Patent
Park et al.

(10) Patent No.: US 6,431,447 B1
(45) Date of Patent: Aug. 13, 2002

(54) SYSTEM AND METHOD FOR READING A BARCODE USING LASER DIODE ARRAY

(75) Inventors: Moon Sung Park; Jae Gwan Song; Dong Chin Woo; Hye Kyu Kim; Chee Hang Park, all of Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/499,920

(22) Filed: Feb. 8, 2000

(30) Foreign Application Priority Data

Dec. 27, 1999 (KR) ............................................ 99-62378

(51) Int. Cl.[7] .............................. G06K 7/10; G06K 9/00
(52) U.S. Cl. ............. 235/462.02; 235/494; 235/462.16; 382/101
(58) Field of Search ....................... 235/462.01–462.49, 235/494; 382/101, 102

(56) References Cited

U.S. PATENT DOCUMENTS

| 4,822,986 A | * | 4/1989 | Guthmueller et al. ........ 235/462 |
| 5,249,687 A | | 10/1993 | Rosenbaum et al. ......... 209/3.3 |
| 5,298,731 A | * | 3/1994 | Ett .......................... 235/462.02 |
| 5,420,403 A | | 5/1995 | Allum et al. ................. 235/75 |
| 5,481,098 A | * | 1/1996 | Davis et al. ............. 235/462.07 |
| 5,608,200 A | * | 3/1997 | Le Goff et al. ............. 235/462 |
| 5,898,153 A | * | 4/1999 | Lagan et al. ................ 235/375 |
| 5,923,017 A | * | 7/1999 | Bjorner et al. ............. 235/385 |
| 6,176,428 B1 | * | 1/2001 | Joseph et al. ............. 235/462.1 |

FOREIGN PATENT DOCUMENTS

JP          10261073 A  *  9/1998

OTHER PUBLICATIONS

J. Strohmeyer et al., "Carrier sequence bar code sorter," United States Postal Service Advanced Technology Conference. vol. 2, pp. 1061–1074: Nov. 1992.

* cited by examiner

Primary Examiner—Michael G. Lee
Assistant Examiner—Jamara A. Franklin
(74) Attorney, Agent, or Firm—SEED IP Law Group PLLC

(57) ABSTRACT

This invention is related to a system and a method for reading high precision printed barcodes and their specification verification. The presented invention has a technique of reading both logistic sorting barcode (one or two dimension) and multi-layered structure barcode such as four-state barcode for automatic postal matter sorting. The invention also investigates height of high densely reduced barcodes in more than 3 steps, and precisely measures and reads the values of black bars thickness and white spaces. Previous techniques used laser beam for reading barcodes, but could not read barcodes, which have print density of less than 1/100 mm~1/1,000 mm unit, and, it was also impossible to read precise specification values in case that barcode specification was composed of length unit indexes. The presented invention overcomes the previous said problems by using a laser diode array.

11 Claims, 6 Drawing Sheets

SYSTEM AND METHOD FOR READING A BARCODE USING LASER DIODE ARRAY

TECHNICAL FIELD

The present invention is related to a system that reads high densely recorded barcodes by using a laser diode array and interfaces with an information system. In detail, said invention is the barcode reading system and the reading method using the laser diode array for realizing postal service automation and logistic sorting automation.

BACKGROUND OF THE INVENTION

Generally, for the automatic postal matter sort, a postal service platform uses four-state barcode print in 0.001 mm specification, which needs to be read by precise measurement method. Moreover, in a logistics information platform, a $3/1000 \sim 5/1000$ inch spot is scanned and read for logistics sorting purposes, which is comprised of one- or two-dimensional barcodes. But, in this case if the barcodes are reduced to less than some extent of scale, i.e., $1/1000$ mm, a large amount of information could be recorded but it would be impossible to read. Namely, it is possible to decipher the barcodes with the distance between bars at least in the range of 0.076~0.152 mm. In the case of logistics barcode, because the barcodes are required to be printed repetitively for large quantity products by using the fixed lot number and information of those large quantity lots, a precise system, which accurately measures and verifies printed barcode quality, is required.

As stated above, in logistical purpose barcode as well as postal information barcode, it is very important to develop a system and a method that can examine and verify the quality of barcodes, which are used as a method of information acquisition and can accurately read those barcodes. Especially in the case of the postal information platform, for the fast sorting of postal matters, the print quality of barcode is more important than ever. In the case of the logistics platform, the print quality is again important for reading a large amount of information of the moving barcodes attached on products moving at a high speed.

In other words, a four-state barcode reader, which is used in automatic postal matter sorting, examines and reads the barcode's accurate print status and is applied to automatic postal sorting system and, contributes improving the postal service productivity. For this purpose, an important aspect is the precise barcode reading capability.

Previous methods for reading barcodes used either a laser beam or an image capturing method. But the laser beam is unable to read small barcodes because its barcode reading standard spot size is as large as 0.7~0.15 mm unit. And, in case the of image capturing method, if one pixel value is defined as 600 PPI (Pixel Per Inch), its unit is about 0.042 mm, which enables precise barcode reading. But, for reading barcodes in the 600 PPI level, the reading area becomes small and correspondingly, the printed barcode's position must be changed or it will be impossible to read the long barcodes.

If the laser beam is applied to an automatic postal sorting system, the following problems occur. Namely, according to the moving speed of the spot, which is scanned on moving objects, and of the barcode printed objects (postal matters), an unread area can occur. And, if barcodes are read through scanning the laser beam on fixed reading objects by using a handheld barcode reader, information is acquired by ratio values, which cannot read with less than a 0.001 mm unit accurately.

As mentioned, if the laser beam barcode reading method is applied to the automatic postal sorting system, partially reduced or enlarged barcodes are not able to be sorted. Namely, erroneous postal matters due to the error in reading the bar's width, space and height are sorted as erroneous postal matters when performing automatic postal sorting, and they need to be sorted by hand.

Moreover, if logistics purpose barcodes are reduced and printed less than a certain size (generally less than $1/1000$ mm), it is impossible to read them by the previous barcode reading method and, to enhance the reading capability, the reading resolution of bars and spaces should be high. Previous barcode reading resolution is in a range of $3/1,000 \sim 5/1,000$ inch, which is very difficult to obtain precise barcode reading.

SUMMARY OF THE INVENTION

This invention provides a system and a method of reading precise specification barcodes by sampling the acquired pulses through moving and scanning the reading objects, the printed 4-state barcodes or high-density barcodes, with a two-dimensional laser diode array.

A barcode reading system using a laser diode array of the present invention is provided. The barcode system includes barcode reading means, bar detecting means, information value calculating means, barcode reference table, and barcode information analyzing means.

The barcode reading means is for acquiring barcode information from a barcode image of an object by using a laser diode array. The bar detecting means is for recognizing a barcode type and detecting a beginning bar and an ending bar by using the acquired barcode information. The information value calculating means is for acquiring information of a black bar's thickness and height values, and white bar's space values from the beginning bar and the ending bar. The barcode reference table is for storing barcode analysis information in accordance with a barcode type. The barcode information analyzing means is for analyzing a barcode between the beginning bar and the ending bar by referencing the reference table in accordance with the barcode type.

Preferably, the barcode reading system of present invention further includes data sampling means. The data sampling means is for sampling the acquired barcode information by a laser diode unit and forwarding the sampled information to the bar detecting means.

More preferably, the barcode reading system further includes input means, driving means, moving beginning sensing means, and moving ending sensing means. The input means is for inputting a barcode reading beginning signal. The driving means is for moving the object into near the barcode reading means when the barcode reading beginning signal is inputted. The moving beginning sensing means is for sensing the object and generating a control signal to operate the barcode reading means when the object is approaching near the reading means. The moving ending sensing means is for sensing a moving ending of the object after the barcode information is read, and generating a control signal to end the operation of the barcode reading means.

Preferably, the laser diode array of the barcode reading means is 2×8 or 4×8 array.

A method for reading a barcode using a laser diode array of present invention is provided. The method includes the following steps. A barcode reading step is for acquiring barcode information from a barcode image of an object by using a laser diode array. A bar detecting step is for recognizing a barcode type and detecting a beginning bar and an ending bar by using the acquired barcode information. An information value calculating step is for acquiring information of a back bar's thickness and height values, and white bar's space values from the beginning bar and the ending bar. A barcode information analyzing step is for analyzing a barcode between the beginning bar and the ending bar by referencing a reference table in accordance with a barcode type, wherein the barcode reference table stores barcode analysis information in accordance with the barcode type.

Preferably, the method further includes a data sampling step. The data sampling step is for sampling the acquired barcode information by a laser diode unit and forwarding the sampled information to the bar detecting step.

More preferably, if the barcode type is a four-state barcode consisting of an ascender bar, a tracker bar and a full height bar, the barcode information analyzing step includes the following steps: A step for dividing the four-state bar into an upper area, a middle area, and a lower area; a step for obtaining a maximum value, a minimum value and an average value of the thickness of the black bar and the space value of the white bar, respectively; a step for obtaining a maximum value, a minimum value and an average value of the height value of the black bar; a step for dividing the barcode information by the character unit; and a step for applying the character unit barcode to the reference table to obtain the regarding information.

Preferably, the method further includes the following steps: A step for correcting an error by means of the check character included in the barcode information, and obtaining the regarding information by applying the reference table, if the error is occurred during the step of obtaining the regarding information; and a step for generating a regarding message and outputting the generated message, if the error is uncorrectable.

A computer readable recording media which records the computer program of present invention is provided. The program includes the following steps. The barcode reading step is for acquiring barcode information from a barcode image of an object by using a laser diode array. The bar detecting step is for recognizing a barcode type and detecting a beginning bar and an ending bar by using the acquired barcode information. The information value calculating step is for acquiring information of a back bar's thickness and height values, and white bar's space values from the beginning bar and the ending bar. And the barcode information analyzing step is for analyzing a barcode between the beginning bar and the ending bar by referencing a reference table in accordance with a barcode type, wherein the barcode reference table stores barcode analysis information in accordance with the barcode type.

BRIEF DESCRIPTION OF THE DRAWINGS

The embodiment of the present invention will be explained with the reference to the accompanying drawings, in which.

DETAILED DESCRIPTION OF THE INVENTION

Figure 1:
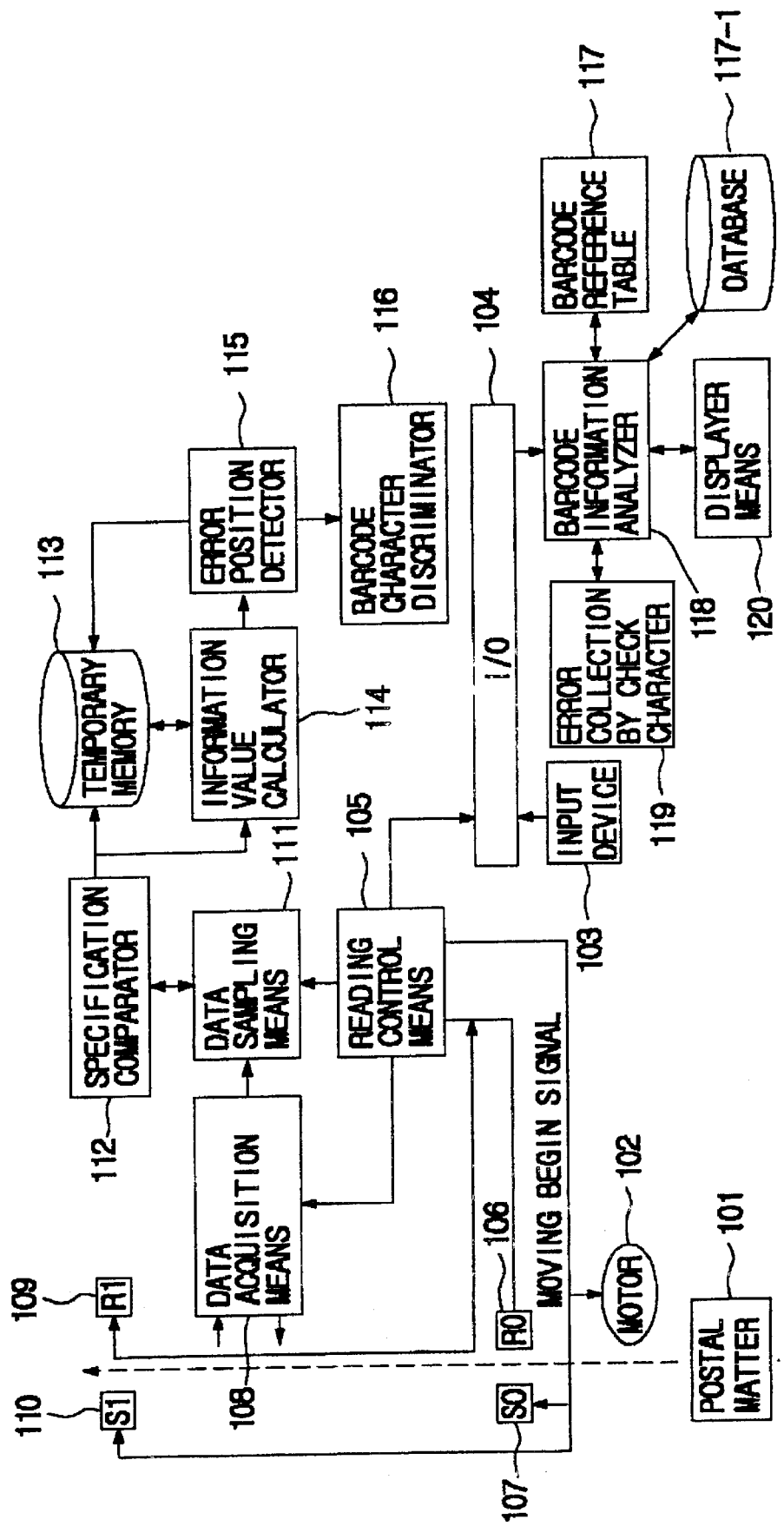
FIG. 1 illustrates the barcode reading system diagram using the laser diode array as an example of using the laser diode array.

FIG. 1 illustrates the barcode reading system diagram using the laser diode array as an example of using the laser diode array.

The barcode reading system using the laser diode array is located in front of transferring part to read the barcode printed in address area.

The reading beginning order is inputted by the input device 103 and this reading beginning order is transferred to the reading control means 105. This reading control means 105 drives a motor 102 to move postal matter. When this postal matter is moving, optical sensors 106, 107 recognize this moving, and a postal matter moving begin signal, which is output from the optical sensor 106, 107, is transferred to the reading control means 105. The reading control means 105 output the control signal so as to operate the data acquisition means 108 and data sampling means 111.

The data acquisition means 108 acquires the data of the postal matter's certain area, desirably the barcode printed area, and the data sampling means 111 samples the acquired data. At this time, the data acquisition means 108 obtains the data of the barcode printed area by using the two-dimensional laser diode array, and the data sampling means 111 samples data regarding the area by the laser diode unit.

The sampled barcode data is provided as the specification comparator 112 and, this comparator 112 examines barcode patterns of acquired data. Namely, it examines the barcode types such as one or two-dimensional or four-state three bars or 4-state two bars. And this specification comparator 112 detects the beginning bar by comparing black and white bars' width, height, and spaces in the regarding area. This beginning bar can be generally detected by the sum of full height bar and tracker bar. The specification comparator 112 stores the barcode area value acquired by the laser diodes from the beginning bar at a temporary memory 113 in the order of the laser diodes' arrange number.

The barcode area data are acquired from the two-dimensional laser diode array and sampled, and barcode area information, acquired by diode arrange number, such as bars' thickness, spaces and height, are stored at a temporary memory 113 in accordance with the said arrange number. Also, the specification comparator 112 recognizes the end bar. Namely, if the white space value is larger than that of the tracker bar's standard or the end of the postal matter is sensed by the optical sensors 109, 110, the data acquisition means 108 is stopped, and the acquired information is transferred to an information value calculator 114.

The error position detector 115 reads the barcode information sequentially from the temporary memory and divides that information as ascender bar, tracker bar, and descender bar area and calculates the maximum, minimum and average values of the bars' thickness and spaces in each area. At this time, among the barcode thickness values, if an erroneous reading has occurred due to the white dot, namely, if the bars' thickness is narrower or thicker than the specification, a compensation is performed. The compensated position information is stored at temporary memory 113. If the error has occurred but is not a compensated case, both bar's position and error identification number are stored at the temporary memory 113.

As a result of these steps, the upper, middle and lower area status information is stored at the temporary memory, and the weight setting means 116 generates arranging values of this barcode and sets the weight of each bar. For the analysis convenience in a barcode character unit, the message is generated in a way of dividing the information area, comprised of four-state 2 bar and four-state 3 bar. If an error has occurred, an information frame, including error position number, is generated.

The barcode character discriminator 116 transfers the generated messages to the barcode information analyzer 118, which analyzes the barcode information from the in/output controller 108. The barcode information analyzer 118 analyzes the received massage from the input/output controller 108 by referencing the barcode reference table 117, and it calculates the check characters. By the analyzed information, which is through the barcode reference table 117, the database 117-1 is accessed, which contains zip code and delivery information, and the analyzer 118 compares the reading information and searched information.

Namely, barcode information analyzer 118 compares the check character information printed in the postal matter with recorded barcode character information. And, in the case that error position information is received, the barcode character error corrector 119 performs the error correction through the check character by comparing the barcode character value with the check character value. This error corrected information is displayed at the displayer means 120. At the barcode information analysis step, for analyzing the one or two dimensional barcode information, the analysis is possible by referencing the reference table through the barcode type information value acquired by the barcode type detection step.

Figure 2:
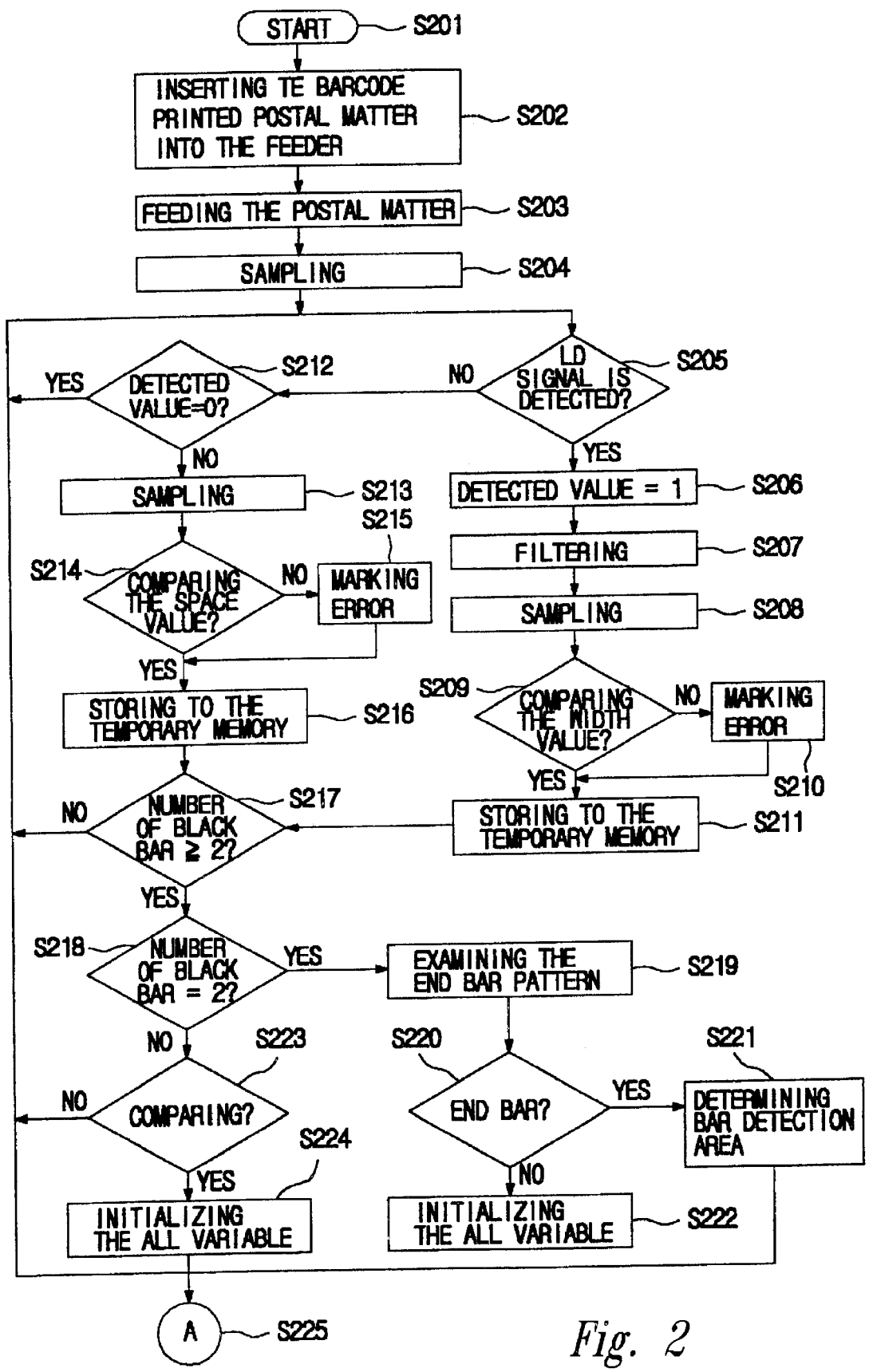
FIG. 2 illustrates the flow chart to depict the barcode reading method by using the laser diode array as an example of using the laser diode array.

FIG. 2 illustrates the flow chart, which depicts the analysis method by reading the four-state barcode in accordance with laser diode arrange method as an example of the presented invention's realization.

First, to begin the barcode reading (S201), the barcode printed postal matter is put into the feeder (S202). When the beginning command for reading the postal matter is input, the motor is driven to move the postal matter (S203). When the system is initialized and postal matter reading beginning is recognized, sampling is started (S204). If the black bar is detected by the laser diode array means (S205), the black bar recognition is set (S206). Filtering, which filters the signal detected by the each laser diode in accordance with the standard level values, is performed (S207). After the filtering, sampling of the black bar's signal value is performed (S208). This value is compared with the width value of the barcode's fixed specification (S209). If the black bar's sampling value is out of the specification value range, an error is marked (S210), and it is stored to the temporary memory (S211) including the black bar's detection order number and laser diode detection order number.

If the white space is detected before the black bar is detected, the fact that the black bar is recognized before the white space recognition is examined (S212). If the black bar is recognized before the white bar recognition, white space value is sampled (S213). Black bar's order number, laser diode detection order number and white bar's order number, is generated. Comparison of the white space sampling value with the fixed white bar space value is performed (S214). If the white space sampling value is different than the white bar's specification value, an error is marked (S215) and stored to the temporary memory (S216). If two black bars exist (S217, S218), the recorded data are read from the temporary memory and the end pattern is examined (S219) among the four-state barcode characters. If it is the end bar (S220), divide to upper, middle, and lower area, and determine the tracker, ascender and descender bar detection area. The information, which belongs to only the laser diode detector selected area, can be stored to the temporary memory (S211). If it is not the end bar (S220), initialize (S222) the every variable, which are generated for the barcode reading and, proceed to the S205 step. If the next black bar is detected, the above procedure is repetitively performed.

If the number of black bar is more than two (S218), white bar and black bar's space values of the middle area are compared (S223) until the begin bar is detected and, the read values are sequentially stored to the temporary memory. If the width and space values of tracker bar are not read for a certain time, check the moving postal matter whether it is detected at the stopping optical sensor. If the completion signal is obtained from this sensor, initialize (S224) the every variable to read the next postal matter, and analyze the data stored to the temporary memory, and prepare to read the next postal matter.

In case of one or two-dimensional barcode, because it can be recognized from step S202, which recognize the four-state bar, to step S211, it can recognize types of the barcode by means of the end bar and check character's types. In this one or two-dimensional barcode case, the reading method and storing method of the detected signals by the laser diodes have the same flow as shown in the example of FIG. 2. In information analysis step, if the regarding barcode information expression and reading method are applied, every kind of the barcode can be read.

Figure 3:
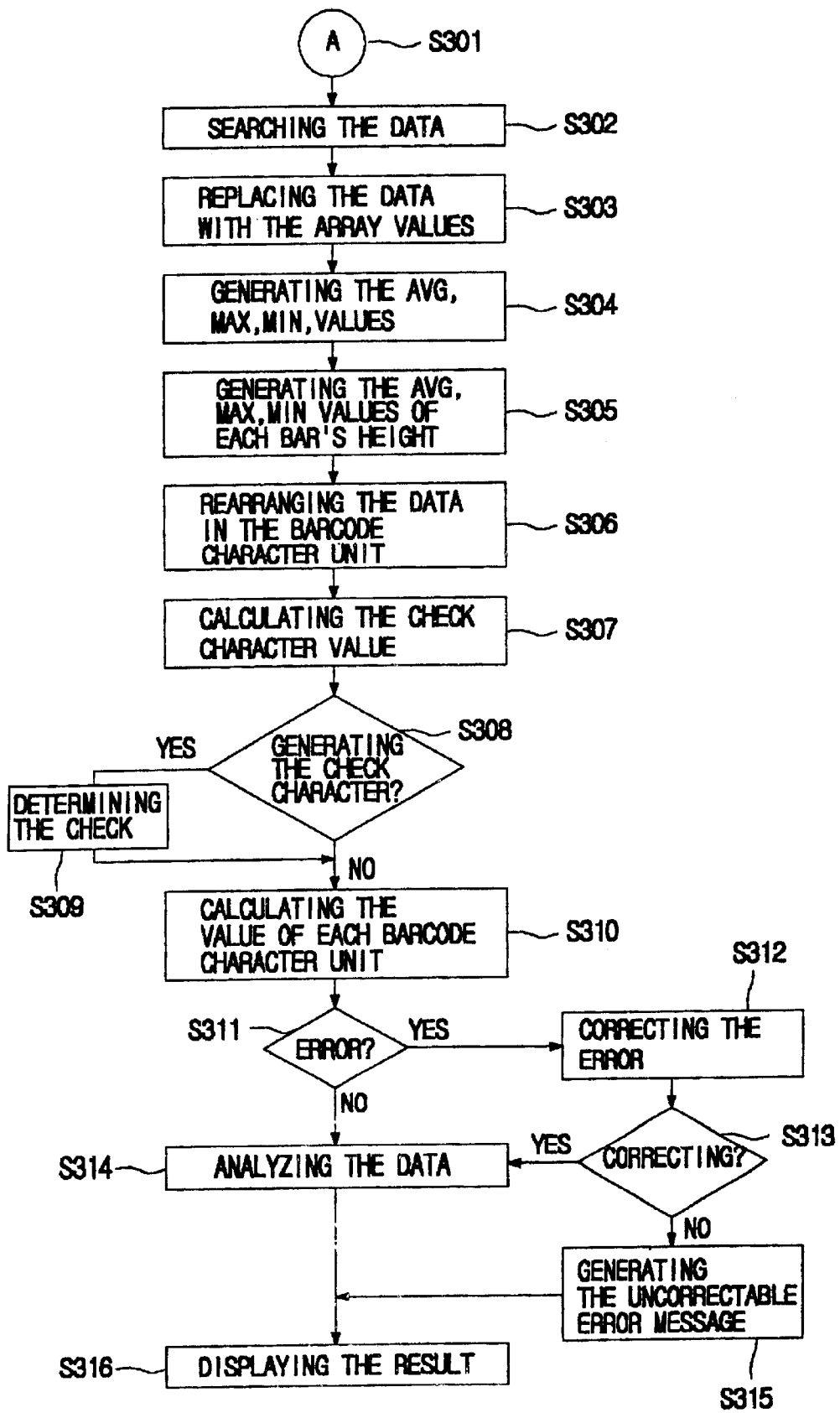
FIG. 3 illustrates the flow chart of using laser diode array to execute the reading result of barcode reading system as an example of using the laser diode array.

FIG. 3 is the flow chart illustrating the four-state barcode decoding procedure after reading the four-state barcode reading data stored at the temporary memory by using the laser diode array presented in this invention.

If the reading data through FIG. 1 and FIG. 2 are stored to the temporary memory, these data are investigated to the upper, middle and lower area (S302) in accordance with the predetermined barcode area values. These data are replaced with the array values, which has upper and lower value (S303). After that, the average, maximum and minimum values (S304) of the black and white values which are located at the same area are generated. The average, maximum and minimum values (S305) of the each bar's height are then generated. As the result of the above steps, the beginning and the end bar are distinguished and, determine the weight of each bar and, rearrange the above data in a barcode character unit, including the error marked information.

And, according to the data from the above steps, calculate the check character value (S307) and verify whether the check character value exists (S308). If the check character exists from the S308 step, determine that check character value for the error correction is normally recognized (S309). If the check character value includes the error, the value is set to zero (0), and calculate the value of each barcode's character unit (S310). If an error is occurred during analyzing the barcode character value (S311), error correction is performed (S312) for the case of normal value of check character. If there is no check character and barcode character has an error (S313), the uncorrectable error massage is generated (S315) and the result is displayed (S316). If the error is corrected (S311), these data are analyzed by using the barcode reference table (S314), and the result is displayed (S316).

To check the analyzed data, which utilize reference table to analyze the barcode information, the reading result from the zip code and the delivery information database with the database searched data (S314) is compared. Through these steps, in the process of reading and displaying the four-state barcode, barcode reading value and error information, which is from error position detector, are displayed. In case of one-dimensional barcode, because the upper and lower values are identical, the reading mode can be applied through each bar's average width and space values.

Figure 4:
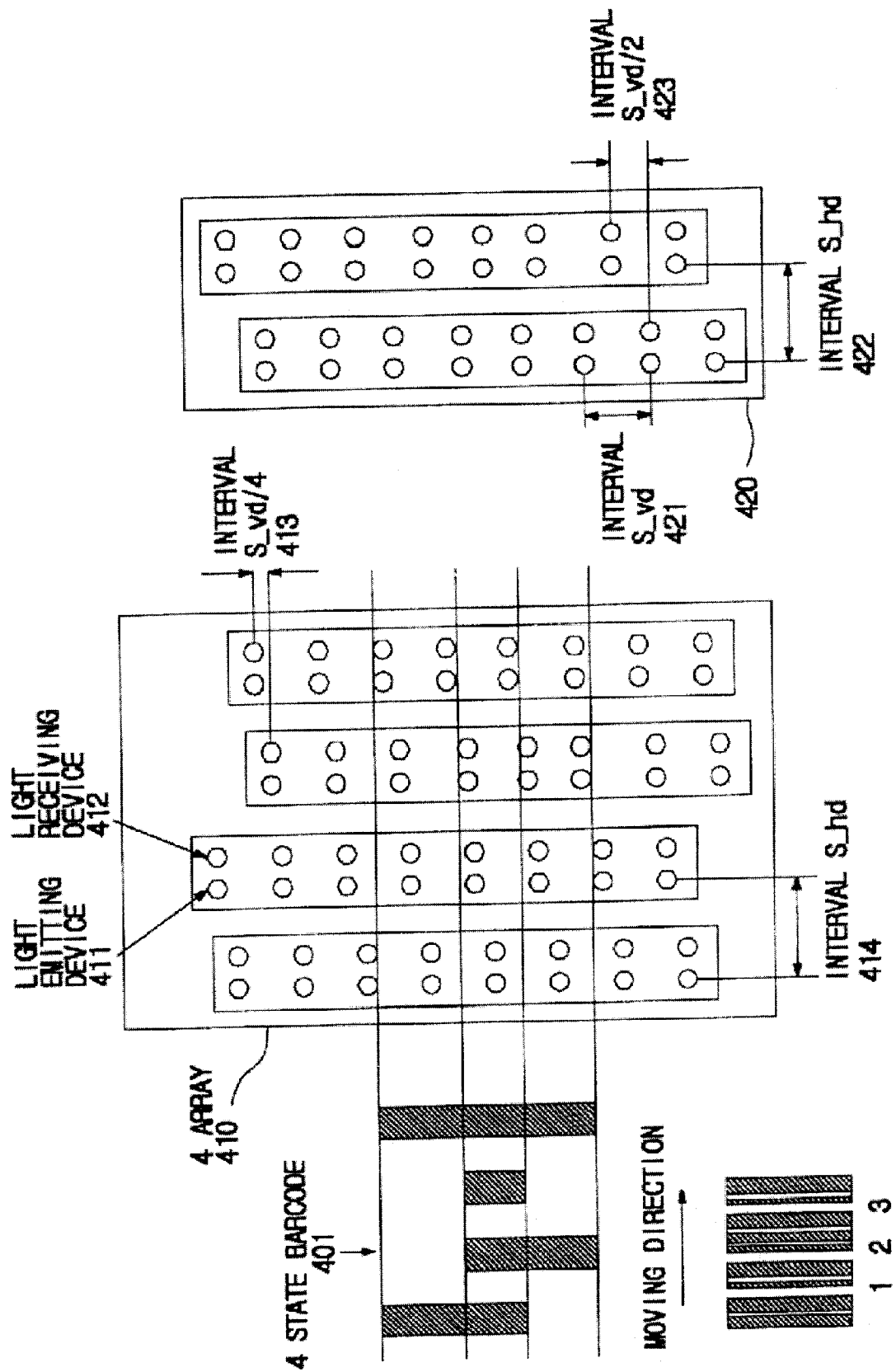
FIG. 4 illustrates reading means structure of the reading system in accordance with arrange method of laser diodes as an example of using the laser diode array.

FIG. 4 illustrates the structure of reading means by using the laser diode array presented in this invention. Four-state barcode has four different height bars, which is comprised of ascender bar, descender bar, tracker bar and full height bar, from left to right, respectively. The end bar is the one which is read very first and is comprised of the full height bar and tracker bar. According to the height and width values of the full height bar and the tracker bar, and white space value, the four-state bar's standard can be determined. Namely, full height can be divided in to upper, middle, and lower area or upper and lower area.

The beginning bar, which is symmetric to the end bar, consists of tracker bar and full height bar, and enable to conveniently acquire the barcode position information by using the barcode reader or image capture device. The organization methods of laser diode array, which enable to conveniently acquire one or two-dimensional barcode information, are 2×8 array (420), 4×8 (410) or the combination of those two methods. Four-state barcode is to be detected by 4×8 array method. The tracker bar is read by three lasers diode and, both ascender and descender bar are read by five laser diodes. And to apply the above characteristics, laser diode's upper and lower height 413, 421, 423 and distance 414, 422 is arranged.

Figure 5A:
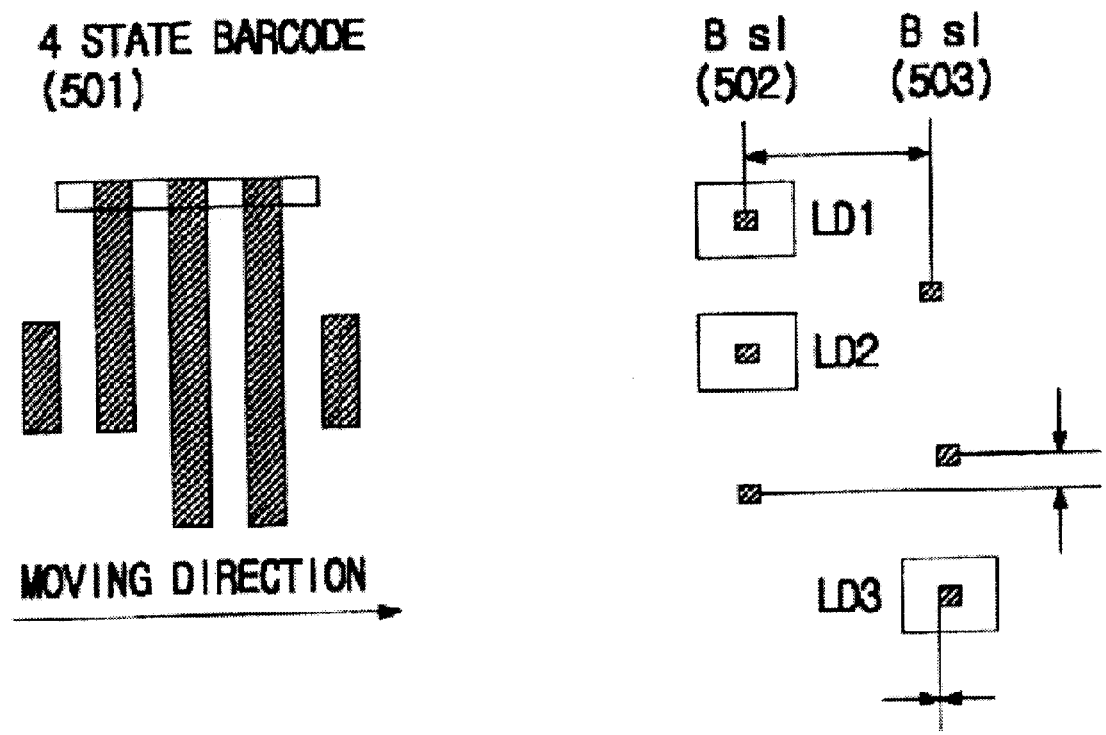
FIG. 5 illustrates the signal processing method to analyze the reading result from the barcode reading system as an example of using the laser diode array.
Figure 5B:
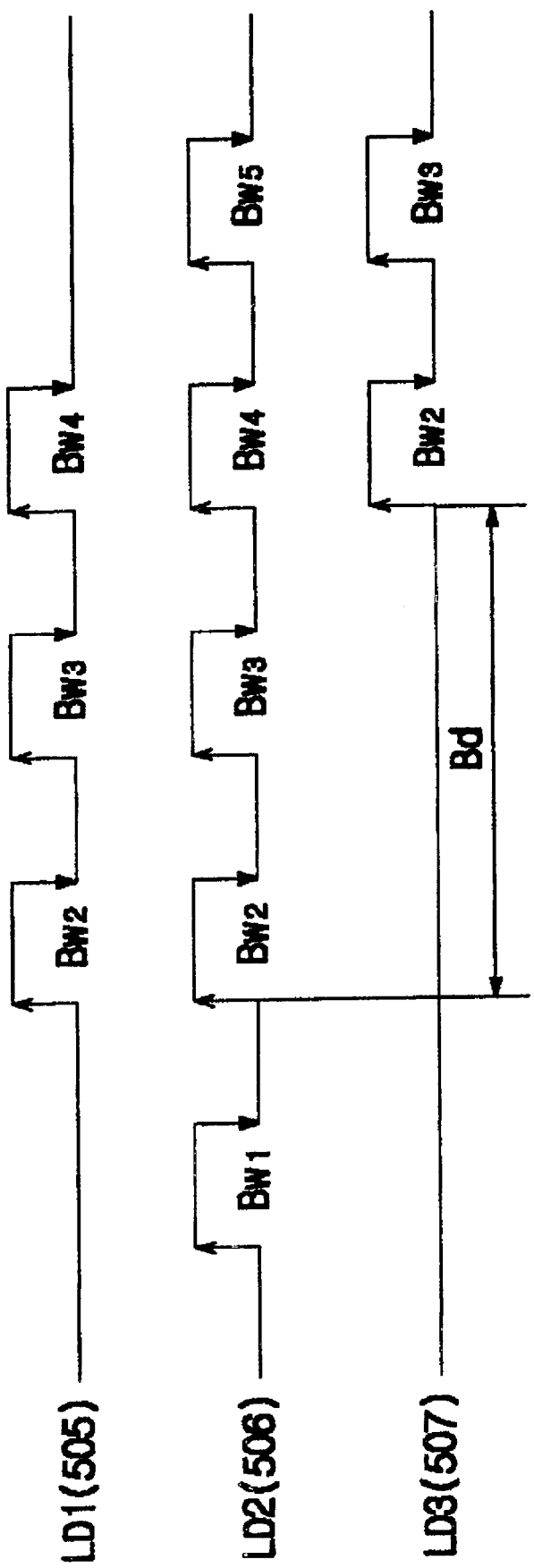

FIG. 5 illustrates the signal processes when the barcode information is recognized by the laser diode presented in this invention. As depicted in (a), a random four-state barcode case 501, when the middle part of the barcode is moving, the signal is detected at each diode LD1 505, LD2 506 and LD3 507 in accordance with the bar's width as depicted in (b).

From the drawing, the values from Bw1 to Bw6 are the obtained signal in accordance with the bar's moving sequence, and the values of bar's width and spaces are obtained by sampling the values between bars. The fist laser diode LD1 505 detects the upper area signal, the second laser diode LD3 detects the lower area signal and the third laser diode detects lower area signal. When these values are arranged, it is possible to read the barcode character.

When these methods are applied to the two-dimensional barcode, mode selection function, which analyze the reading signal in accordance with the array's width and height, and, two-dimensional barcode reading method can be applied.

Although representative embodiments of the present invention have been disclosed based on the good realizable examples, these examples are not to confine the invention but to give illustrative examples. For those who are skilled in the field where this invention is belonged will appreciate that various modifications, additions and substitutions are possible without departing from the scope and sprit of the present invention as defined in the accompanying claims and the equivalents thereof.

What we claim:

1. Four-state barcode reading system using a laser diode array, said four-state barcode consists of ascender bar, descender bar, tracker bar and full height bar, the system comprising:

barcode reading means for acquiring barcode information from a barcode image of an object by using the laser diode array;

bar detecting means for recognizing a barcode type and detecting a beginning bar and an ending bar by using the acquired barcode information;

information value calculating means for acquiring information of a black bar's thickness and height values, and white bar's space values from the beginning bar and the ending bar;

barcode reference table for storing barcode analysis information of the four-state barcode type; and barcode information analyzing means for analyzing a barcode between the beginning bar and the ending bar and configured to divide a four-state bar of the four-state barcode into an upper area, a middle area and a lower area; obtain a maximum value, a minimum value, and an average value of the thickness of the black bar and the space value of the white bar, respectively; determine a maximum value, a minimum value and an average value of the height value of the black bar; divide the barcode information by a character unit; and to apply the character unit barcode to the barcode reference table to obtain the information.

2. The barcode reading system of claim 1, further comprising:

data sampling means for sampling the acquired barcode information by a laser diode unit and forwarding the sampled information to the bar detecting means.

3. The barcode reading system of claim 2, further comprising:

input means for inputting a barcode reading beginning signal;

driving means for moving the object into near the barcode reading means when the barcode reading beginning signal is inputted;

moving beginning sensing means for sensing the object and generating a control signal to operate the barcode reading means when the object is approaching near the reading means;

moving ending sensing means for sensing a moving ending of the object after the barcode information is read, and generating a control signal to end the operation of the barcode reading means.

4. The barcode reading system of claim 3, wherein the laser diode array of the barcode reading means is 2×8 array.

5. The barcode reading system of claim 3, wherein the laser diode array of the barcode reading means is 4×8 array.

6. Method for reading a four-state barcode using a laser diode array, said four-state barcode consists of ascender bar, descender bar, tracker bar and full height bar, the method comprising the steps of:

barcode reading step for acquiring barcode information from a barcode image of an object by using a laser diode array;

bar detecting step for recognizing a barcode type and detecting a beginning bar and an ending bar by using the acquired barcode information;

information value calculating step for acquiring information of a black bar's thickness and height values, and white bar's space values from the beginning bar and the ending bar; and barcode information analyzing step for analyzing a barcode between the beginning bar and the ending bar, comprising the steps of:

dividing a four-state bar of the four-state barcode into an upper area, a middle area and a lower area;

obtaining a maximum value, a minimum value and an average value of the thickness of the black bar and the space value of the white bar, respectively;

obtaining a maximum value, a minimum value and an average value of the height value of the black bar;

dividing the barcode information by a character unit; and applying the character unit barcode to a barcode reference table to obtain the regarding information.

7. The method of claim 6, further comprising the step of:

data sampling step for sampling the acquired barcode information by a laser diode unit and forwarding the sampled information to the bar detecting step.

8. The method of claim 7, wherein the laser diode array of the barcode reading step is 2×8 array.

9. The method of claim 7, wherein the laser diode array of the barcode reading step is 4×8 array.

10. The method of claim 6, further comprising the steps of:

correcting an error by means of a check character included in the barcode information, and obtaining the regarding information by applying the reference table, if the error is occurred during the step of obtaining the regarding information; and generating a regarding message and outputting the generated message, if the error is uncorrectable.

11. A storage medium readable by a and comprising: a stored program of instructions executable by the computer to read a four-state barcode using a laser diode array, the instructions including the process of:

reading the barcode to acquire barcode information from a barcode image of an object by using a laser diode array;

recognizing a barcode type and detecting a beginning bar and an ending bar by using the acquired barcode information;

acquiring information of a black bar's thickness and height values, and a white bar's space values from the beginning bar and the ending bar; and analyzing the barcode between the beginning bar and the ending bar, and including:

dividing a four-state bar of the four-state barcode into an upper area, a middle area and a lower area;

obtaining a maximum value, a minimum value and an average value of the thickness of the black bar and the space value of the white bar, respectively;

obtaining a maximum value, a minimum value and an average value of the height value of the black bar;

dividing the barcode information by a character unit; and applying the character unit barcode to a barcode reference table to obtain the regarding information.

* * * * *